United States Patent [19]
Michels et al.

[11] 3,719,927
[45] March 6, 1973

[54] CREDIT CONTROL SYSTEM

[75] Inventors: Lawrence S. Michels, Palos Verdes Peninsula; George F. Minka, Torrance; Donald G. Kovar, Palos Verdes Peninsula; Robert V. Harper, Harbor City, all of Calif.

[73] Assignee: TRW Data Systems, Inc., Torrance, Calif.

[22] Filed: Dec. 28, 1970

[21] Appl. No.: 101,712

[52] U.S. Cl.........340/149 R, 235/61.7 B, 340/152 R
[51] Int. Cl.............................G06k 5/00, H04q 5/00
[58] Field of Search..................340/149, 149 A, 152; 235/61.7 B, 61.7; 179/2 CA

[56] References Cited

UNITED STATES PATENTS

| | | | |
|---|---|---|---|
| 3,559,175 | 1/1971 | Pomeroy | 340/149 A |
| 3,564,210 | 2/1971 | Presti | 340/149 A |
| 3,576,539 | 4/1971 | Huber | 340/152 |
| 3,594,727 | 7/1971 | Braun | 340/152 |
| 3,484,744 | 12/1969 | Gertler et al. | 340/146.1 |

*Primary Examiner*—Donald J. Yusko
*Attorney*—Daniel T. Anderson, Harry I. Jacobs and Edwin A. Oser

[57] ABSTRACT

A credit control system which positively authorizes every credit purchase, furnishes account balance status and accumulates the dollar amount of every credit purchase. Customer account numbers, status, credit limit and account balance are stored in a magnetic memory. Remote keyboard units interrogate the memory as to account number and amount of purchase for each purchaser. If the status of the account is valid and there is a positive credit balance, a credit authorization signal is received at the remote keyboard unit. If the status of the account is invalid, or if the status of the account is valid and the credit balance is negative, a credit denial signal is received at the remote keyboard unit, and a credit authorizer unit is activated. The credit authorizer unit permits manual electronic inspection of the credit file of interest to determine if credit should be authorized for the current transaction. If credit is to be authorized, or denied, a credit authorization, or denial signal is received at the remote keyboard unit.

11 Claims, 14 Drawing Figures

3,719,927
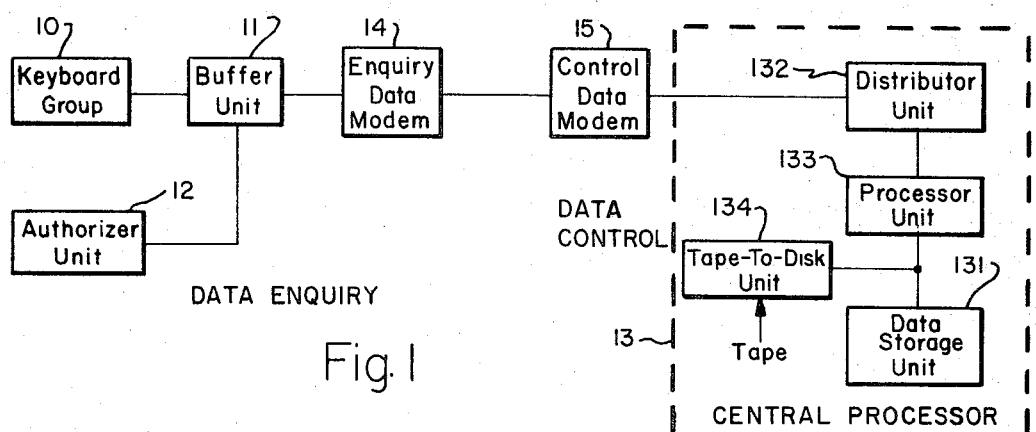
Fig. 1
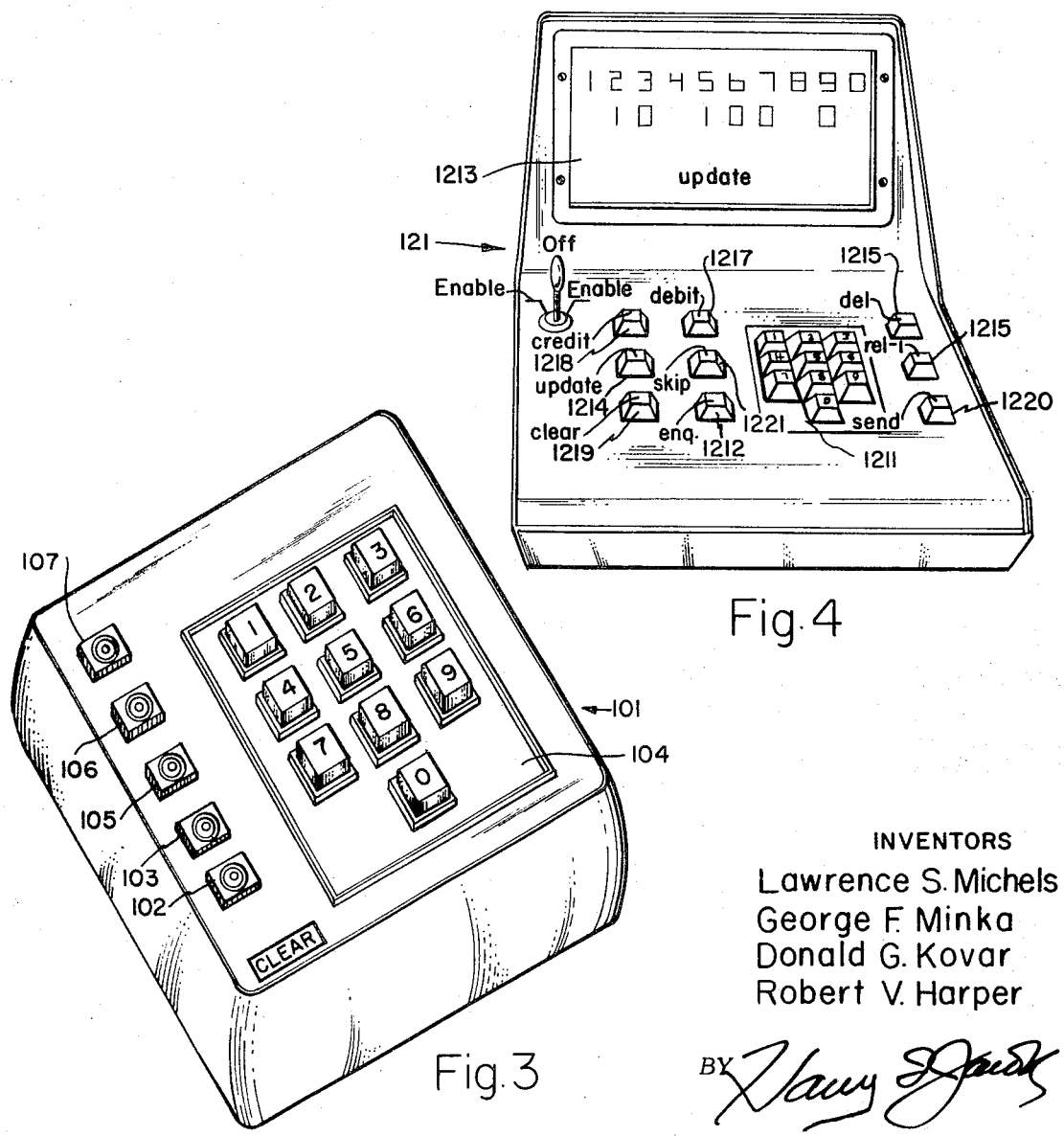
Fig. 4
Fig. 3
INVENTORS
Lawrence S. Michels
George F. Minka
Donald G. Kovar
Robert V. Harper
ATTORNEY INVENTORS
Lawrence F. Michels
George F. Minka
Donald G. Kovar
Robert V. Harper

ATTORNEY

R = Red
Y = Yellow
G = Green
Valid Account Number = Check Digit Verification
◯ = Status Response Sent INVENTORS
Lawrence F. Michels
George F. Minka
Donald G. Kovar
Robert V. Harper R = Red
Y = Yellow
G = Green
Valid Account Number = Check Digit Verification ◯ = Status Response

CREDIT CONTROL SYSTEM

BACKGROUND OF THE INVENTION

In large retail stores, the problem of checking the identity of a prospective credit customer, the status of his account and his credit balance is as old as retail stores themselves. Very early credit control systems customarily referred each credit sale to a "credit man" whose special duty was to keep track of credit customers so as to be able to pass judgment upon the responsibility of each purchaser. Considerable delays between the request for credit approval and approval of credit were common as it was necessary to send a messenger to the credit man with a charge slip to be verified and await the return of the messenger.

By the turn of the 20th century, many stores had installed pneumatic tube systems to replace runners. Pneumatic tube systems were still not fast enough for the ever increasing pace of business.

With the advent of the telephone, stores were able to avoid "this annoying delay and secure immediate authorization for the credit . . ." See U.S. Pat. No. 939,245 to Jacob Oscar Greenwald which discloses a credit control system employing telephones and electrical check punching or imprinting devices at various substations which are connected with a central station where the credit man or the authority for extending credit is located with his records.

According to the Greenwald patent, when goods are ordered to be charged on account, the clerk or attendant at the station places the sales slip in an authorization device and telephones to the credit man the name and address of the customer, the amount of the purchase, and like information. The credit man looks through his card indexes or other records to determine whether the customer is entitled to credit. If the customer is entitled to credit an authorization switch is pressed, and the credit authorization unit stamps the sales slip. See, for example, the system disclosed in U.S. Pat. No. 975,533 to Charles F. Kettering.

The basic system disclosed in these early patents, circa 1910, is the system used today by many department stores. The only improvements have been that account numbers are used instead of names, and in some stores, the credit records have been computerized to permit real time video display.

In the early 1960's, a number of credit account verification systems were developed. These systems employed memory storage units which held the names or account numbers of all customers, and the status of their account, i.e., good or bad. These systems required large expenditures of capital to install, and many stores refused to make the investment. These systems are so-called "positive" systems as they store the account numbers for every customer, and positively identify him. See U.S. Pat. No. 3,212,062 to R. N. Goldman et al.

An improved system was developed which stored only the names of "bad" customers. By simply determining whether a match existed between a prospective credit customer's account number and the account numbers listed on the "bad" list, approval or denial of credit could be accomplished. See U.S. Pat. No. 3,344,258 to Lawrence S. Michels and assigned to the same assignee as the present invention, and U.S. Pat. No. 3,465,289 to Ronald L. Klein, which discloses a validity checking system. These patents are directed to so-called "negative" systems because they typically store only "bad" accounts.

None of the prior art systems, however, provide for checking the credit balance of a prospective credit customer. They merely provided a check as to the validity of a credit account. It is for this reason that such validity checking systems have not found wide acceptance in the field.

It would be desirable, therefore, to have a credit control system which would be capable of checking the status, and current credit account balance for each credit purchase without resorting to telephoning a credit man for each purchase and asking him to look up the relevant information; yet still provide the speed of computerized validity checking systems.

SUMMARY

In accordance with an example of a preferred embodiment of the present invention, selected customer account numbers, status, credit limit and account balance are stored in a memory. Each account is assigned an individual credit limit. When the credit limit of the account is reached, a warning is indicated. The limit of the customer may be extended at the discretion of a credit man, based on account information which is available to him at any time through the use of a special terminal at the credit office.

At the time of each transaction, the sales clerk queries the memory as to customer account number and amount of purchase. The verification status is checked and the total accumulated amount (including the current purchase) is compared with a test amount. If a customer exceeds his test amount limit at the time of the transaction or has a restricted verification status, an indication is provided to the sales clerk, and the credit office is alerted. At the credit office, a credit man makes disposition based upon data obtained from the information stored in the memory or from past payment records or credit history. An authorizer unit allows the credit man access to this data and allows him to alter the contents as to verification status and credit limit. Thus the credit limit can be waived for a particular transaction or raised accordingly.

The system, therefore, permits almost instantaneous verification of each purchase for customers having valid accounts making purchases that do not cumulate over their assigned credit limit. If the customer exceeds his limit, instant authorization may be obtained for each purchase using the credit authorizer unit.

BRIEF DESCRIPTION OF THE DRAWING

FIG. 1 is a block diagram of an example of a preferred embodiment of a credit control system according to the present invention;

FIG. 3 is a perspective view of a keyboard unit;

FIG. 4 is a perspective view of the control and display of an authroizer unit;

DESCRIPTION OF THE PREFERRED EMBODIMENTS

Figure 2:
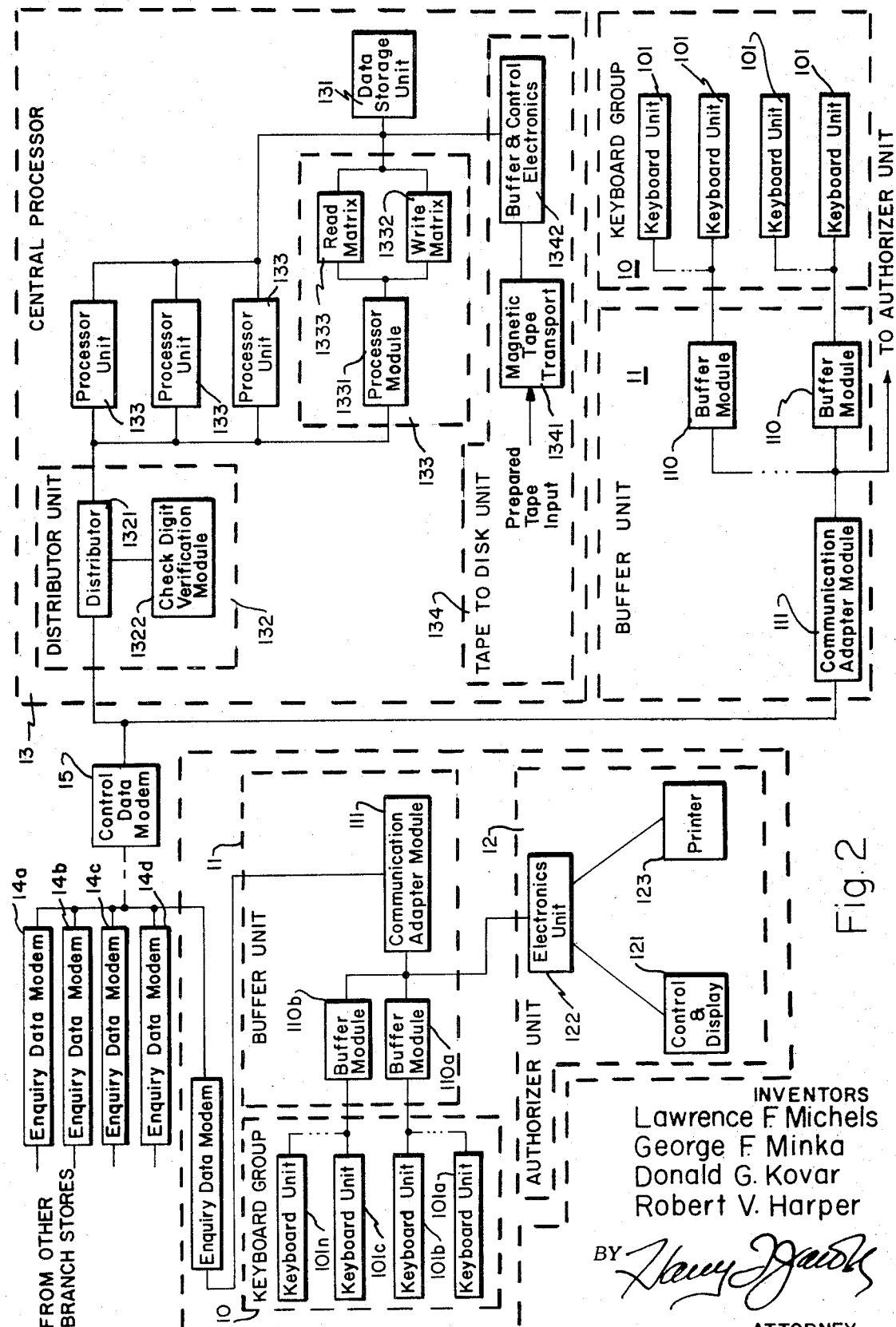
FIG. 2 is a block diagram of a typical chain store installation of a credit control system according to the present invention.

A preferred embodiment of the invention utilizes the "positive by exception" mode of operation. Under this mode of operation, only "exceptional" customers are placed on the memory file at the time of the initial file load. "Exceptional" customers may be those with credit ratings both above and below the norm. The memory file may also include accounts active during the previous month. When a transaction takes place by a customer not on the exception or active list, he is assigned a set of norm parameters and placed on the memory file. Thus, the system is fully positive in the sense that every transaction is recorded, but the file size does not have to be any larger than that required to handle the "exceptions" plus the active accounts.

Referring to FIG. 1, the credit control system of the present invention may consist of four basic subsystem units, a keyboard group 10, a buffer unit 11, an authorizer unit 12 and central processor 13. Enquiry data modem 14 and control data modem 15 may be included if the data enquiry portion (consisting of keyboard group 10, buffer unit 11 and authorizer unit 12) of the system communicates with the central processor over telephone lines.

A functional description of the system will be given first, followed by an analysis of each subsystem unit and an analysis of a flow chart of the central processor, which is the heart of the system.

FIG. 2 shows an example of a chain store installation of a credit control system according to the present invention. Keyboard group 10 comprises a plurality of keyboard units 101a, 101b, 101c, . . . 101n where n is the number of point-of-sale stations in use by the store. For a given number of keyboard units, a volume load factor determines the amount of other subsystem equipment required to support the level of keyboard activity. Typically, up to ten keyboard units 101 feed one buffer module 110.

Each keyboard unit 101 enters the account number and amount of purchase into the credit control system. FIG. 3 shows a perspective view of a typical keyboard unit. The function of the keyboard unit begins when the sales clerk presses a SEND button 102. If a white light appears at 103, buffer unit 11 is clear of traffic. The clerk then proceeds to enter the account number and amount of purchase by pressing the appropriate data keys 104. These numbers are individually transmitted as electrical impulses to a buffer module 110 in buffer unit 11 where they are stored until the complete message is assembled.

The reply is displayed as one of seven possible answers available from the combination of three colored signal lights 105, 106 and 107. Signal light 105 may be green, light 106 yellow (amber) and light 107 red. The seven possible answers are made up of six predetermined customer status indications plus an "all three on" system check indication.

The green, amber and red lights 105–107 are simultaneously displayed ("all three on") during data entry as each key is pressed. This tests the lights and indicates that the buffer module has accepted that particular digit. If lights 105–107 are simultaneously displayed as a reply following a data entry, it indicates that a keying or communication error has occurred and that the enquiry should be repeated.

From the time the white light appears at 103 on a particular keyboard unit, for example keyboard unit 101a, until the answer display lights 105–107 go out, all the other keyboard units connected to the same buffer module 110a are inoperative; thus keyboard unit 101b cannot operate to interfere with keyboard unit 101a. This action is performed by buffer module 110a which also contains automatic timers for shutting off an active keyboard unit if an operator should start an enquiry and fail to complete it. If more than 4 seconds pass between the key depressions, buffer module 110a will disconnect from keyboard unit 101a and the operator must start over. This feature prevents one keyboard unit from monopolizing the buffer unit.

Buffer unit 11 comprises a plurality of buffer modules 110 and a plurality of communication adapter modules 111. Each buffer module 110 can accommodate a number of keyboard units 101 as determined by the volume. A pair of communication adapter modules 111 can accommodate up to 16 buffer modules.

Each buffer module 110 acts as a rate buffer between the keyboard data input rate and the output to the central processor 13. Thus the many seconds of operator time spent pressing keys is kept out of the central processor which completes an inquiry and answer in machine time. To accomplish this, using principles well known in the art, the buffer stores each digit until the complete message is assembled. Then, the message is transmitted through communication adapter module 111 to central processor 13. When central processor 13 returns the answer via the communication adapter module 111, the proper buffer module 110 stores it for the appropriate keyboard unit 101.

Communication adapter modules 111 act as data collection points for up to 16 buffer modules 110 and provide timing and control for telephone line transmission via modems 14 and 15. When an electronic ready signal is sent from a buffer module 110, communication adapter module 111 will lock on to the sending buffer module 110 if it is not in use by another buffer module, serve it, and return an answer. When the response is completed, communication adapter module 111 scans the buffer modules 110 for new signals.

Authorizer unit 12 enables the credit man to release or reject the sale in progress at an outlying credit point. Authorizer units may be located at each branch store, or at a central location. Each authorizer 12 allows the credit man to communicate with the data stored in data storage unit 131 of central processor 13. It is to be understood, that there may be any number of authorizer units operating substantially in parallel for any given credit control installation according to the present invention. Every unit is identical.

Each authorizer unit 12 may consist of two units, a control and display unit 121 (shown in FIG. 4) and an electronics unit 122. As an optional feature, a printer 123 may be used to record all the transactions performed by the authorizer. An example of a printer which can be used with the present system is model EP 101 manufactured by Seiko Company.

Authorizer unit 12 is used to update, delete or add an individual account or to change the test amount or status condition of an individual account. The new information is entered via authorizer keyboard 1211, shown in FIG. 4, which generates the electrical impulses necessary to transmit the data to authorizer. electronics unit 122 where the data bits are stored until one complete message is received.

When the entire message is received by electronics unit 122, it is transmitted through communication adapter 111, similar to the manner in which data from keyboard unit 101 is transmitted via buffer module 110, to central processor 13. When the data arrives at the central processor, the memory files of data storage unit 131 will be altered accordingly. If printer 123 is used, both the authorizer transmission and the processor reply are recorded.

The authorizer unit typically is notified when a sales clerk making an inquiry via a keyboard unit 101 receives a reply that the customer has, for example, exceeded his credit limit, or is behind in his payments.

An operator or credit man in the credit office operates the authorizer to make a disposition based upon data obtained from data storage unit 131 or from master file information such as credit records or payment history. The authorizer allows access to the data in storage unit 131 and the master file, and permits alteration of the contents of storage unit 131 as to verification status, a credit limit and accumulated amount.

The operator of authorizer unit 12 may direct the sales clerk not to complete the transaction or alter the data in storage unit 131 so the transaction will not be restricted, and then direct the sales clerk accordingly. Alteration of data may be accomplished by changing the verification status, changing the test amount (credit limit), changing the accumulated amount or releasing the transaction for one purchase only.

The authorizer permits the operator to perform a number of different functions. When ENQUIRE button 1212 is depressed, the status and amount information associated with a particular account number is flashed on screen 1213. Depressing UPDATE button 1214 allows the operator to enter a new account number, status and amount data or to alter the status amount data via keyboard 1211. DELETE button 1215 causes deletion of an existing account record. RELEASE-1 button allows the operator to clear credit for a single transaction which otherwise would be barred. This operation must follow an ENQUIRY. DEBIT button 1217 is depressed when the operator transmits an amount he wishes added to the accumulated total. CREDIT button 1218 is depressed when the operator transmits an amount he wishes subtracted from the accumulated total. CLEAR button 1219 is used to clear any error made during data entry prior to depressing SEND button 1220 or to clear the system before any data entry. SEND button 1220 is used to begin system processing after all data has been properly assembled and entered into the authorizer unit. SKIP button 1221 allows the operator to by-pass one or two "data fields" in order to enter the data in a desired portion of the memory file, or to cause the accessory printer unit 123 to advance paper. Keyboard 1211 enters the account data into the system by depressing desired numbered push-buttons. See FIG. 4.

Central processor 13 may comprise a distributor unit 132, a plurality of processor units 133, data storage units 131 and a tape-to-disk unit 134. A full description of the operation of central processor 13 follows below with reference to FIG. 6.

Distributor unit 132 functions as a "traffic control" device to monitor and relay signals to and from the communication adapter modules 111 and processor units 133. The distributor is programmed to give priority to answers over inquiries. If any processor unit 133 has an answer to any inquiry, the distributor accepts the answer from the processor unit 133 and transmits it back to the sending communication adapter module.

Distributor unit 132 consists of a distributor 1321 and an optional check digit verification module 1322.

A distributor 1321 may poll up to 16 communication adapters. When a communication adapter module 111 sends an inquiry, distributor 1321 accepts the information, performs error checks, and transmits it to an available processor unit 133. If the message is error free, processor unit 133 starts its cycle. If a message error is detected, distributor 1321 gives an abort indication to processor 133 and sends an error message to the transmitting communication adapter. When this communication is complete, distributor 1321 resumes polling the communication adapter modules for new inquiries.

Check digit verification module 1322 is an optional feature of the distributor unit. When a message comes in from a communication adapter module 111, a check digit verification is made. If a check digit error occurs, the distributor will return an error message to the sending communication adapter, and inform the signal processor to abort.

Each processor unit 133 consists of a processor module 1331, and two memory signal processor modules comprising a read matrix 1332 and a write matrix 1333. Processor module 1331 performs the logical decision functions and the read and write matrices 1332 and 1333 provide the interfacing and signal conditioning required for connection to the storage unit 131.

When processor unit 133 receives an input message, it electronically compares the incoming data with account numbers and credit status recorded in data storage unit 131. When the account number, associated status, and dollar amount information are located, processor unit 133 determines whether or not there is a "restricted" status and whether or not the amount of purchase plus the previous total exceeds the credit limit of the customer.

If the status of the account is restricted, processor 133 returns the restricted status code as part of its answer and does not update the information in the storage unit. The clerk receives a signal indication that the transaction cannot be completed.

If the status of the account is non-restricted, the new amount of the purchase is added to the accumulated amount and the sum compared against the test amount (credit limit). If the new total is acceptable, it is recorded in storage unit 131. The data now stored in storage unit 131 is the account number, status, test amount and new accumulated amount. A green answer will go back to a keyboard unit 101 indicating the sale is acceptable and the processor has accepted it by updating the data storage unit.

If the status is non-restricted, but the amount of the new sale plus the previous total will exceed the test amount, a yellow status code is returned to keyboard unit 101 and the transaction is not accepted by the processor. The new amount will not be stored because of the yellow signal. The yellow signal informs the clerk at the keyboard not to accept the sale until some action is taken by the credit office. An authorizer unit 12 is activated by the yellow signal, and a clerk performs the necessary operations described in the section on authorizer unit 12.

If the input message calls for update or delete, the contents of data storage unit 131 will be altered. In the case of an update, processor module 1331 will search the data storage unit 131 using read matrix 1333, find the location of the account number, and enter the new account number via write matrix 1332. This new information can change any part of the status or amount fields. If the account number cannot be located, processor module 1331 will find an empty location in the file and enter the new data. If the input message calls for delete, processor unit 1331 searches the file via a read matrix 1333, locates the account number, and deletes it from data storage unit 131.

If the status digit associated with the input account number indicates a "clear for one transaction," processor unit 133 adds the new amount of the previous total, enters the new total on the file 131 via write matrix 1332, and returns a green answer independent of whether or not the test amount is exceeded or if the original status digit was restricted. Processor module 1331 recognizes this as RELEASE 1 by means of a flag (electronic signal) on the status digit. This flag was originally placed in data storage unit 131 in the manner of an update as described above. Processor module 1331 removes this flag when the inquiry for this account is cleared for one transaction.

The capability of subtracting a desired amount from the accumulated amount in data storage unit 131 is another mode of operation. The subtract mode command is controlled exclusively by authorizer unit 12; entries from keyboard units 101 are limited only to the add mode. Processor module 1331 enters the subtract mode upon receiving an ENQUIRY control character and a predetermined S1 digit. (This will be explained in detail later.) Subtraction is then carried out independent of the status of the digits stored in data storage unit 131, and all limit conditions are ignored. If a negative amount results, processor module 1331 causes write matrix 1332 to write zeros into data storage unit 131 for the amount field.

Data storage unit 131 provides the central file storage and interfaces with processor units 133. It is capable of storing new or updated information in a non-destructive manner and will read out all stored information. Storage unit 131 may provide a magnetic disk as the storage media. The capacity of the disk is determined by account volume number. For example, five storage units will store 500,000 accounts including a 10 digit account number, 2 digit status and 5 digit amount of each account.

Provision is made for updating a large number of accounts both for initial file load and for periodic refreshing of data. This may be done at the beginning of each month to update the data storage unit 131 to cover errors made in entering transactions, transactions not authorized, etc. A tape-to-disk unit 134 is used for this purpose. A prerecorded magnetic tape 1341 is utilized for data transmission through a buffer storage device 1342 to record new information in data storage unit 131.

A large number of accounts are updated as follows: A magnetic tape is prepared with the new information by a computer and is installed on magnetic tape transport 1341. Transport 1341 sends the new information to buffer and control electronics 1342. The buffer 1342 accepts and stores one block of account numbers at a time and determines, according to a code on the tape, on which track in data storage unit 131 the new information is to be recorded. The block of numbers is transmitted to storage unit 131 and after verifying the integrity of the recording, accepts the next block of numbers from the tape. This process continues until all the data on the magnetic tape has been recorded in data storage unit 131.

It is within the scope of the invention to use a card-to-disk unit instead of a tape-to-disk unit. For such case, a card reader would feed the buffer and control electronics.

Figure 5:
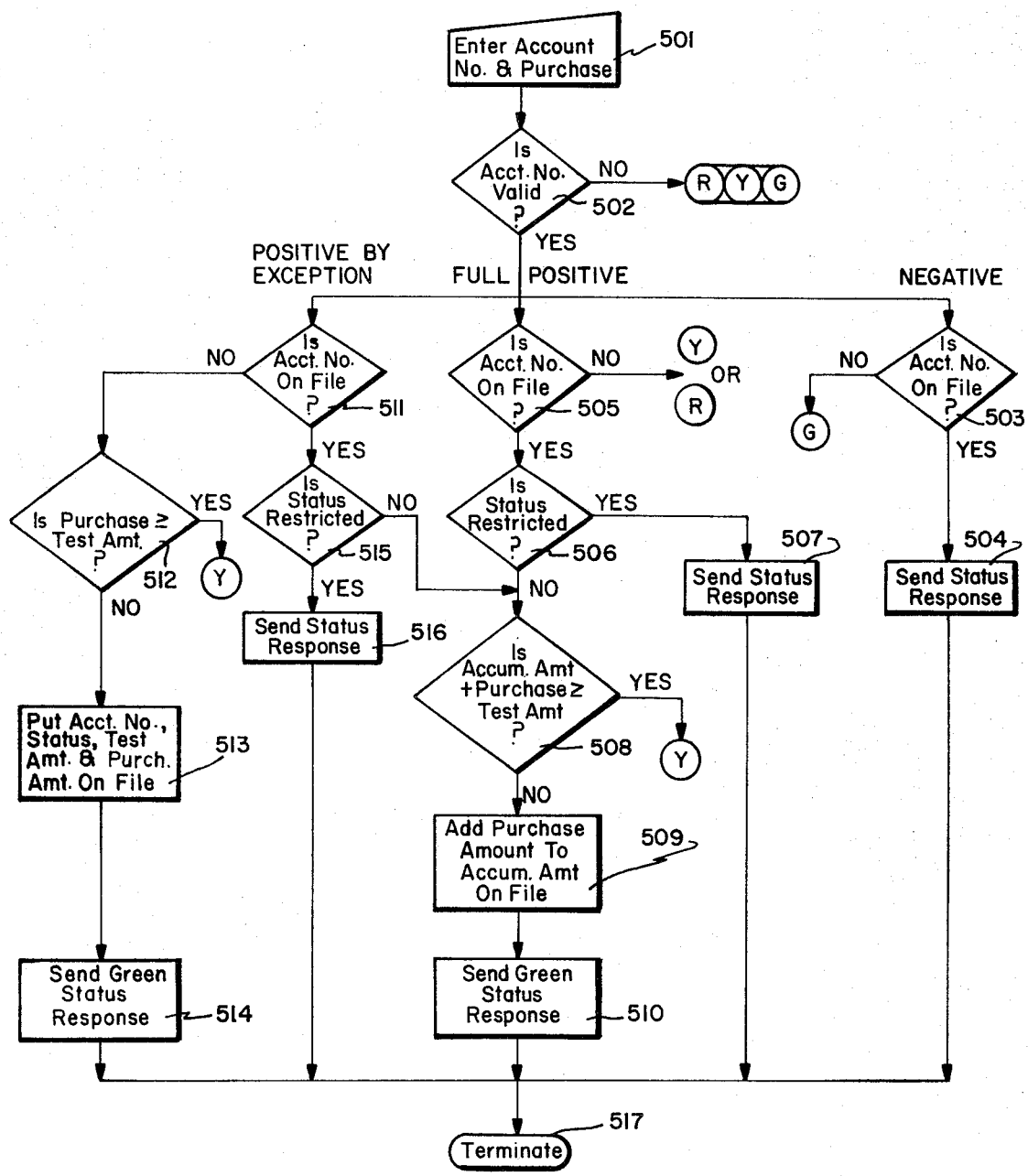
FIG. 5 is a flow chart of the credit control system shown in FIGS. 1 and 2.

The detailed operation of central processor 13 will be explained with reference to FIGS. 5 and 6. FIGS. 5 and 6 are logic flow charts for central processor 13. FIG. 5 is the equivalent of a block diagram flow chart, and FIGS. 6A–6H which comprise FIG. 6 are the equivalent of a circuit type diagram flow chart in that it fully details the operation of central processor 13. Conventional flow chart notation is used in both FIGS. 5 and 6, with rectangular blocks indicating processes or operations to be performed. Diamond blocks represent a comparison to be made, a particular branch root being taken from the diamond box when the mathematical relationship associated with that root represents in fact the comparison of those quantities listed within the block; or a particular exit root is taken from the diamond block when the condition associated with that root represents in fact the condition determined by the required operation.

FIG. 5 is a flow chart of the credit control system and shows the sequence of events for the three modes of operation possible using the central processor disclosed in the present invention. The three modes of operation are "negative", "full positive" and "positive by exception." A preferred embodiment of the invention is the "positive by exception" mode of operation. In the negative mode of operation only the bad or questionable accounts are stored on the file in the memory. Hence, when the memory is scanned, if the account number is not found this indicates the status to be good, thus causing a green light to be lit. If the account number is on the file, then the status of the account number is determined and the appropriate status response is sent back to the keyboard to light either a yellow or red light. For a full understanding of a negative system, see U.S. Pat. No. 3,344,258 to Lawrence S. Michels and assigned to the same assignee as the present invention.

In the "full positive" mode of operation all valid and active account numbers are stored on the file. A preliminary check is made to insure that the account number checked is in fact on the file. If it is not, either a yellow or red response is called for. If the account number is on the file, the status is checked and if good, the accumulated amount plus the purchase amount is compared with the test amount. If the accumulated amount plus purchase amount is less than the test amount, a green status response is sent back and the new purchase amount data is entered on the memory.

In the "positive by exception" mode of operation, only those account numbers which are active accounts or very good or very bad credit risks are stored on the file. Unlike the full positive mode of operation, credit customers having a good credit rating may not be stored on the list. If the account number is on the file, the procedure is the same as for the full positive system. If the account number is not on the file, then determination is made whether the purchase amount is greater than the test amount which is set for account numbers not stored in the memory file. If the purchase amount is less than the test amount, the purchase amount is written into the memory and stored therein. A green status response is then sent back to the appropriate keyboard.

A full explanation of the block logic diagram of FIG. 5 follows. The cycle is initiated by a start operation 501 when the account number and amount of purchase are entered, and thereafter passes through a sequence of operations represented by blocks 502 through 516. The final operation is terminate 517. Three major loops are involved in this cycle; they are the negative loop, the full positive loop, and the positive by exception loop. The following description of the separate component blocks of the block diagram also indicates the interrelationships of these components.

Block 502 — Initiation of the start operation causes block 502 to check the validity of the account number. This means that a check digit verification operation is performed. If the account number is not valid then a status response is sent back to the keyboard causing for example, the red, yellow and green lights to appear.

Block 503 — For negative operation, the memory file is searched to determine if the account number is on file. If the account number is not on file, a green status response is sent back to the keyboard group. If the account number is on file then the status response on file is sent back to the keyboard group.

Block 504 — This block sends the status response appearing on file back to the keyboard group. At this point the cycle terminates at block 517.

Block 505 — This block is the start of full positive operation. The memory file is searched to determine if the account number is stored therein. If the account number is not stored therein it must not be a good account, therefore either a yellow or red light is lit at the originating keyboard. The choice of red or yellow is determined by customer preference.

Blocks 506 and 507 — Block 506 determines whether the status of the account number on file is restricted or not. If the status is restricted, then block 507 sends the status response on file back to the appropriate keyboard.

Blocks 508 - 510 — If the status is not restricted as determined by block 506, then a comparison is made in block 508 to see if the credit balance is positive or negative. This is done by determining whether the accumulated amount of past purchases plus the amount of the present purchase is greater than or equal to a test amount. The test amount is determined by customer preference. If the accumulated amount plus amount of the current purchase is greater than the test amount, then a yellow response is sent back to the keyboard group. Note that at this point the authorizer unit 121 comes into use as explained above. If the accumulated amount plus amount of present purchase is less than the test amount, block 509 adds the purchase amount to the accumulated amount in the memory file and block 510 sends a green status response back to the keyboard group. At this point the cycle terminates at block 517.

Block 511 — The logic diagram of positive by exception mode of operation begins in block 511 where the memory file is searched to determine if the account number is on file.

Blocks 512 - 514 — If the account number is not on file as determined by block 511, then block 512 compares the purchase amount with a test amount. The test amount of block 512 may be the same as, or different from, the test amount of block 508. If the amount of the present purchase is greater than the test amount, a yellow light is sent back to the keyboard group and authorizer 121 is put into use. If the amount of the present purchase is less than the test amount, block 513 writes the account number, status, test amount and purchase amount into the memory file. Block 514 sends a green status response back to the keyboard group. The cycle terminates at block 517.

Block 515 — If the account number is on file, as determined in block 511, then the determination is made as to whether the status of the account listed is restricted. If the status is not restricted then the operations of blocks 508 through 510 are performed and the cycle terminates at 517.

Block 516 — If the status is restricted, then block 516 sends the status response on file back to the keyboard. At this point the cycle terminates at block 517.

Figure 5A:
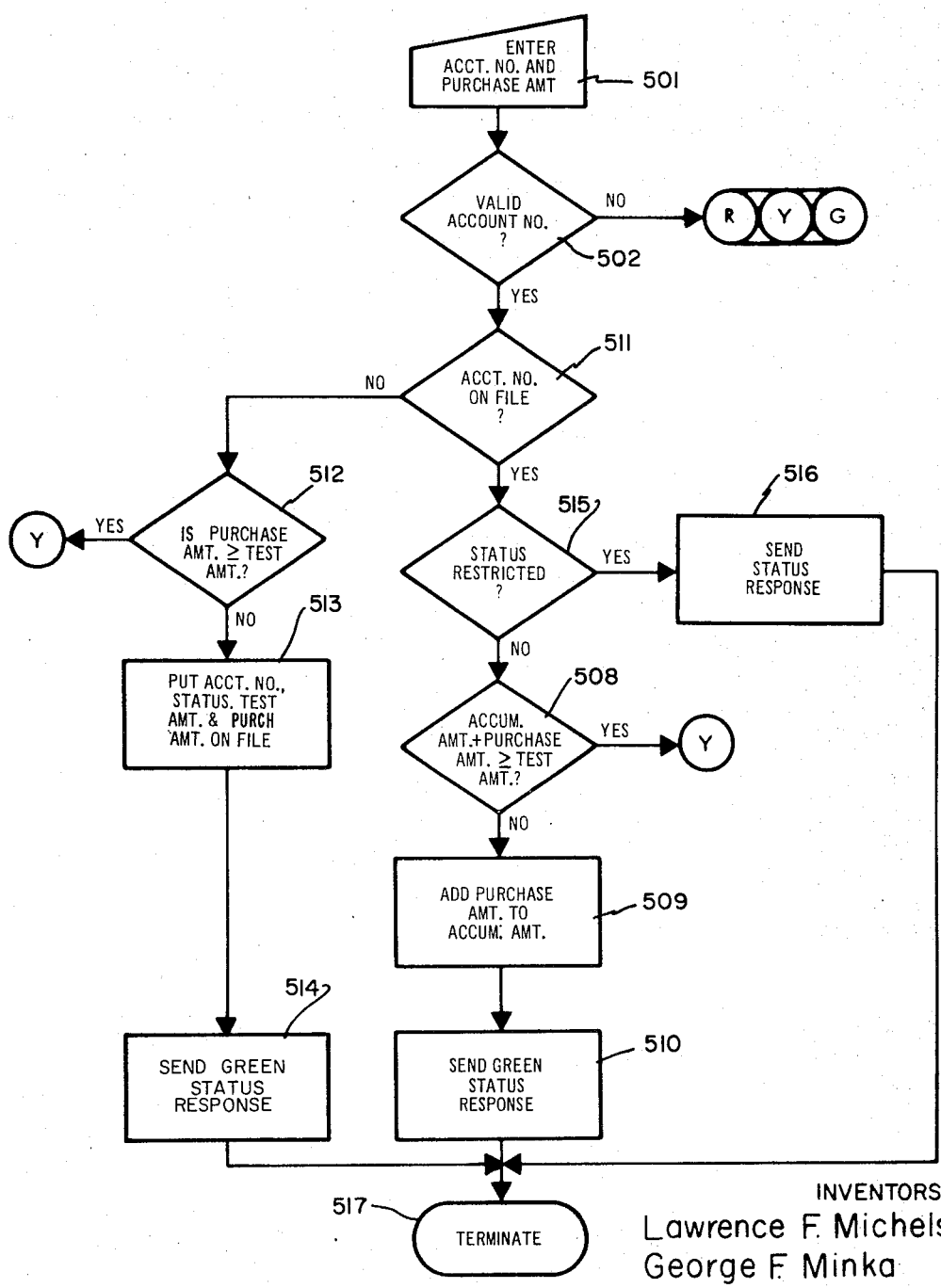
FIG. 5A is a flow chart of the credit control system of FIG. 5 operating in the positive by exception mode.
Figure 6A:
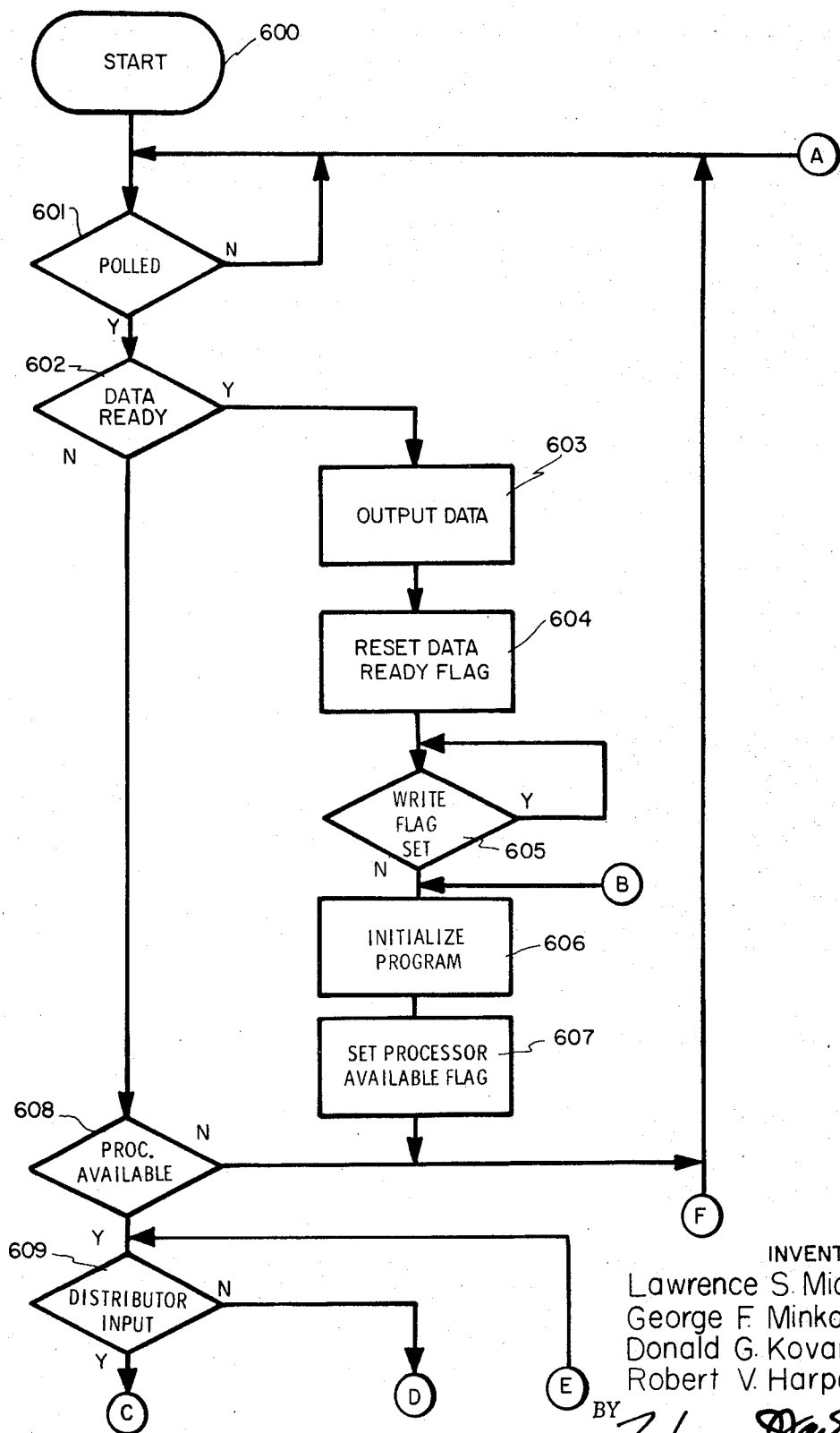
FIGS. 6A–6H taken together are a flow chart of a central processor for the credit control system of FIG. 5.
Figure 6B:
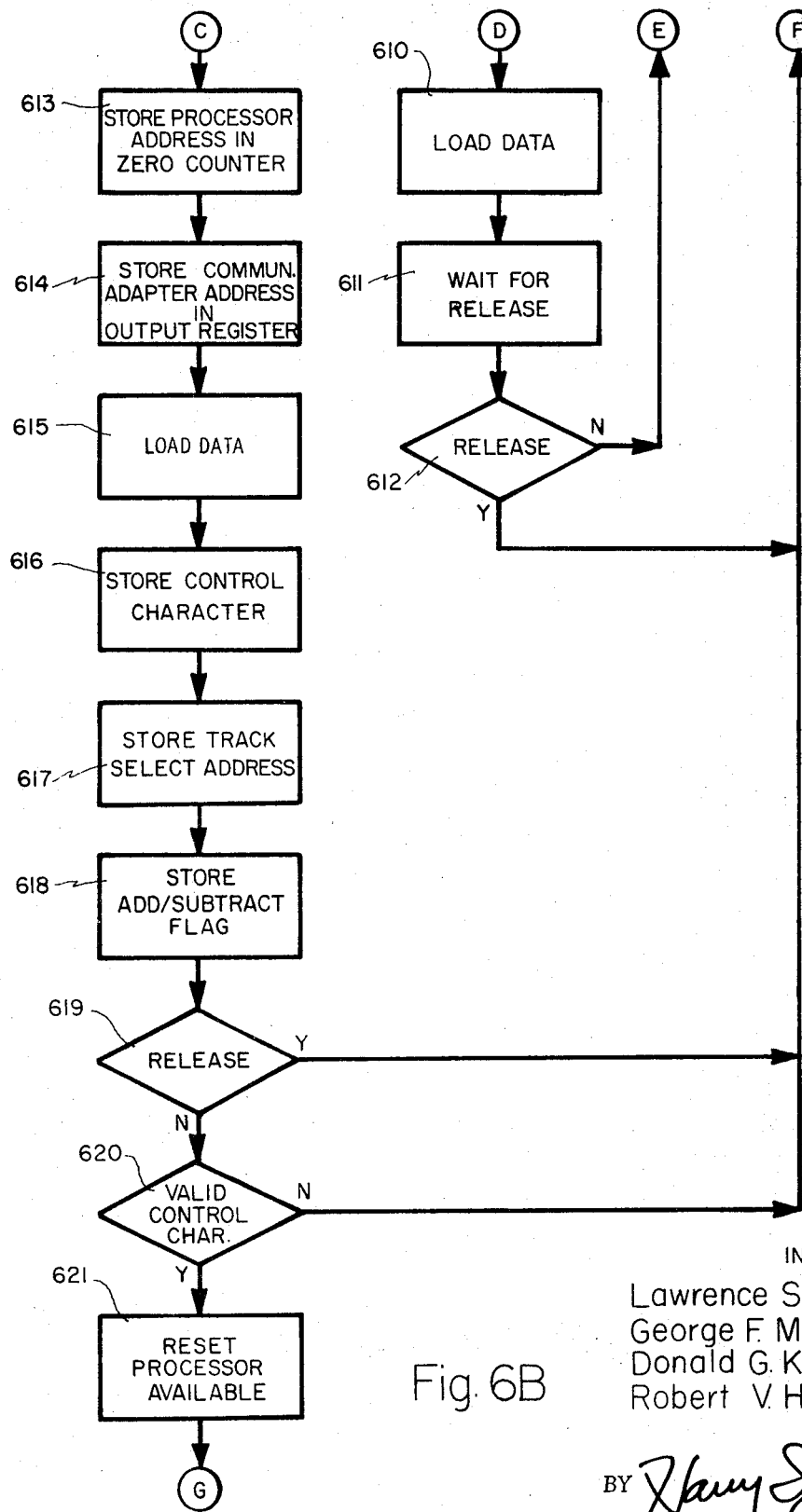
Figure 6C:
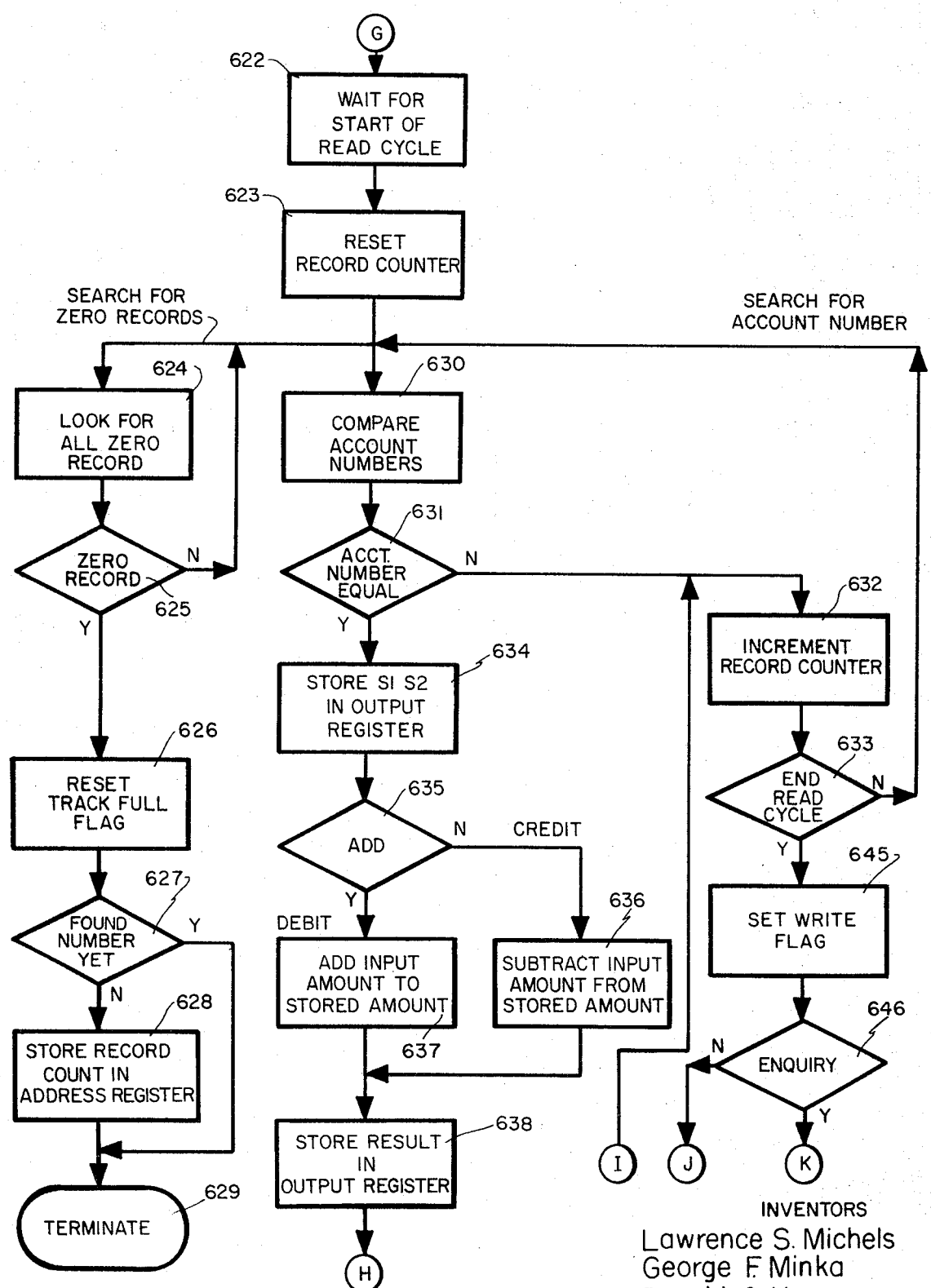
Figure 6D:
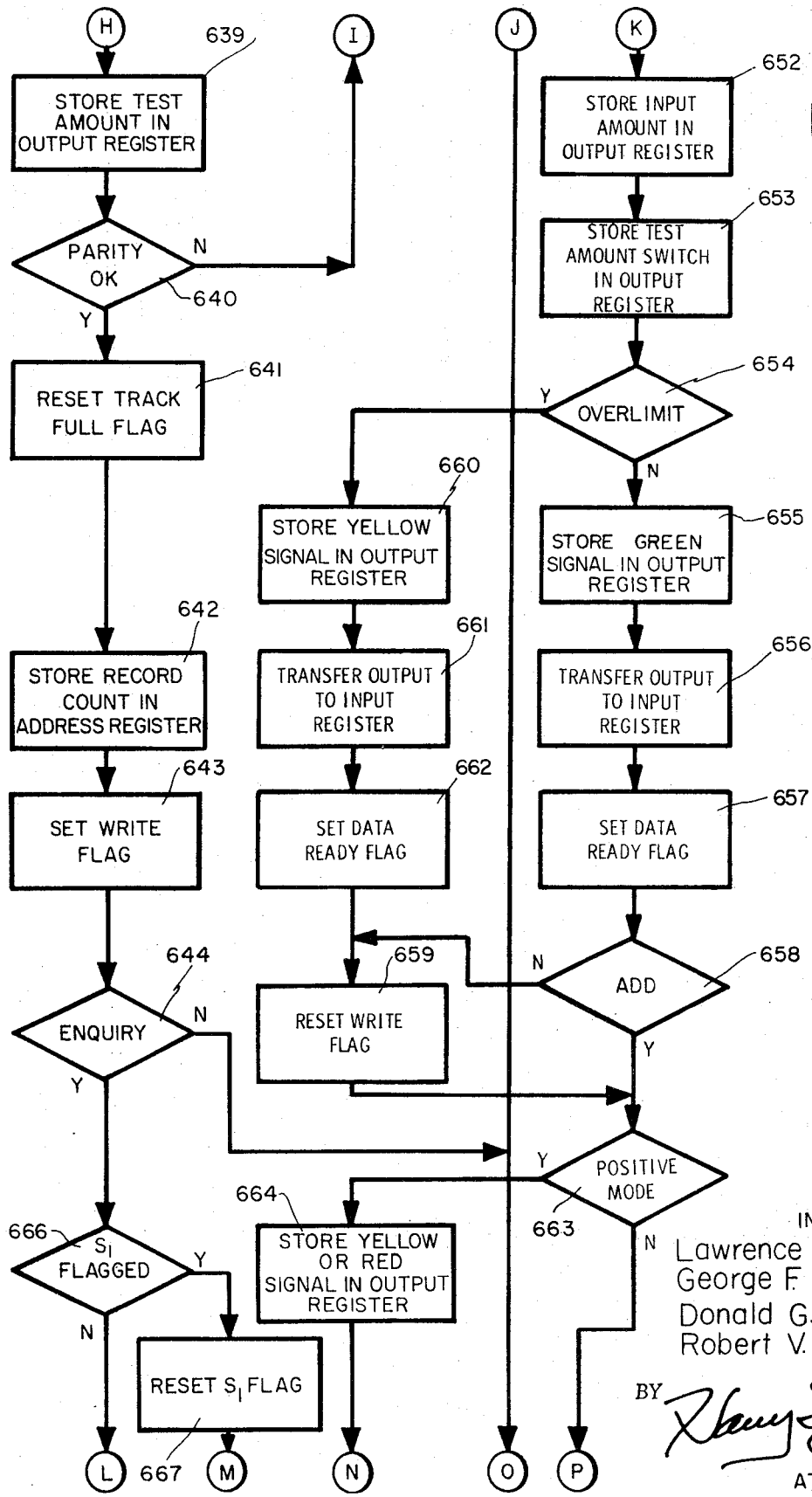
Figure 6E:
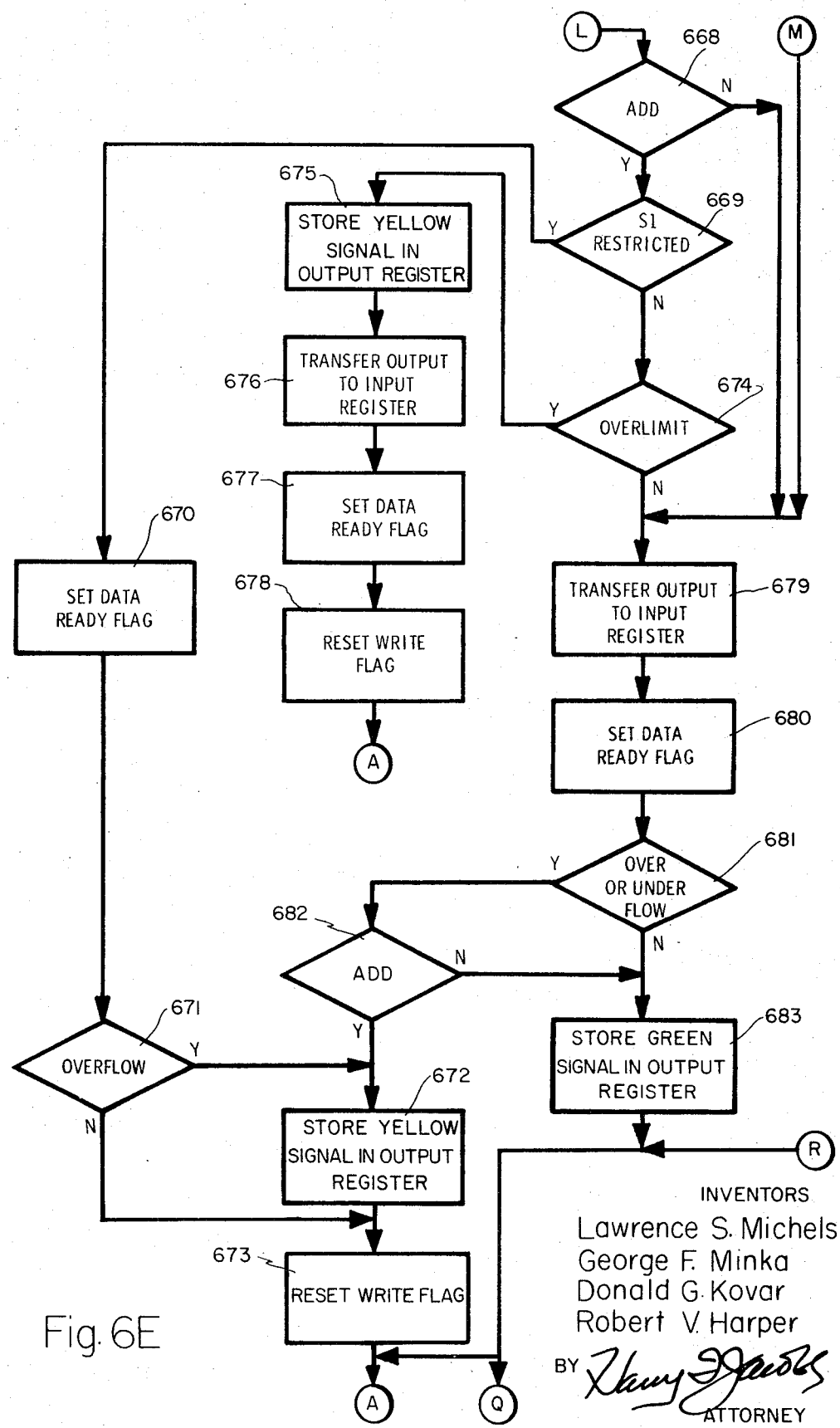
Figure 6F:
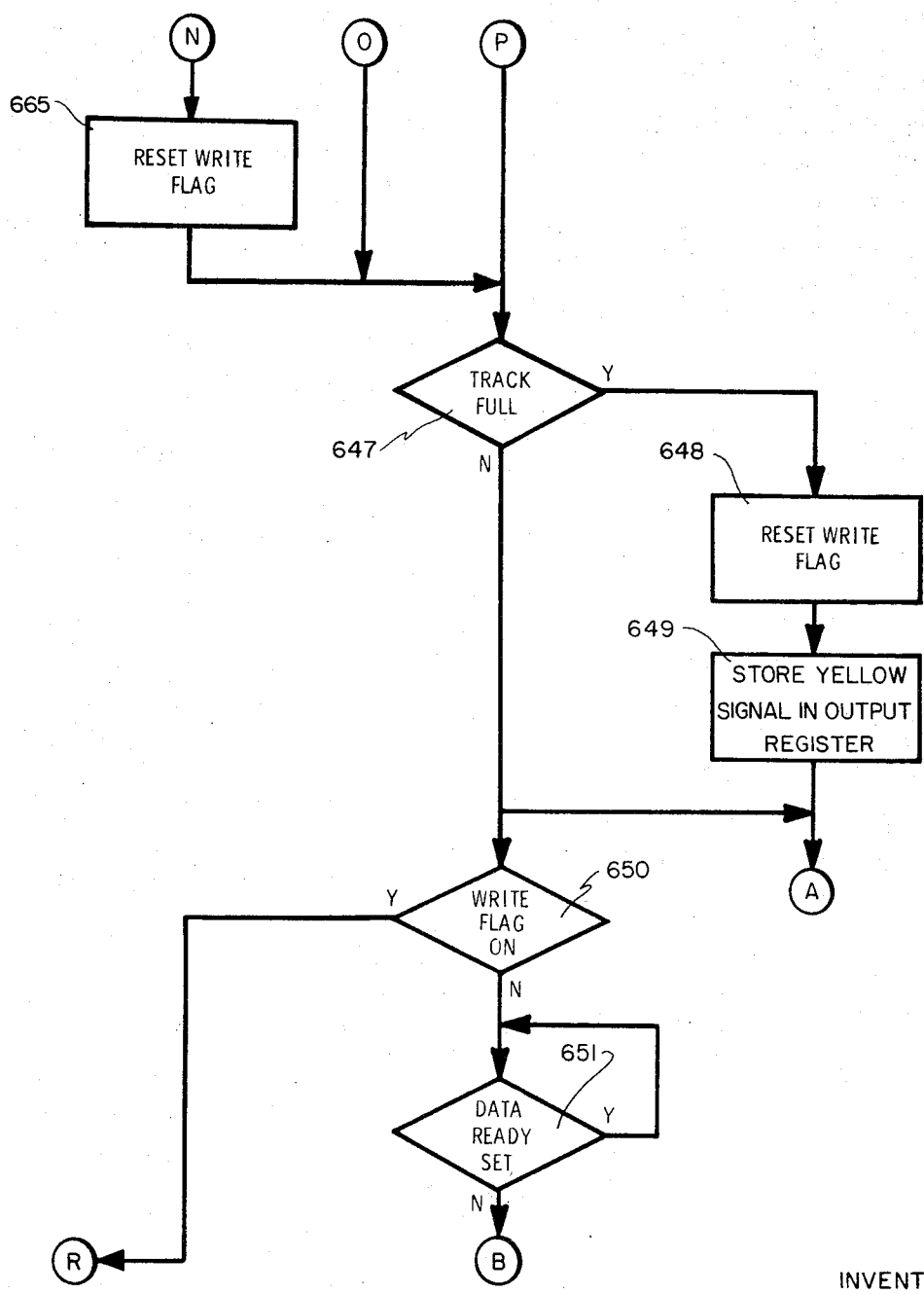
Figure 6G:
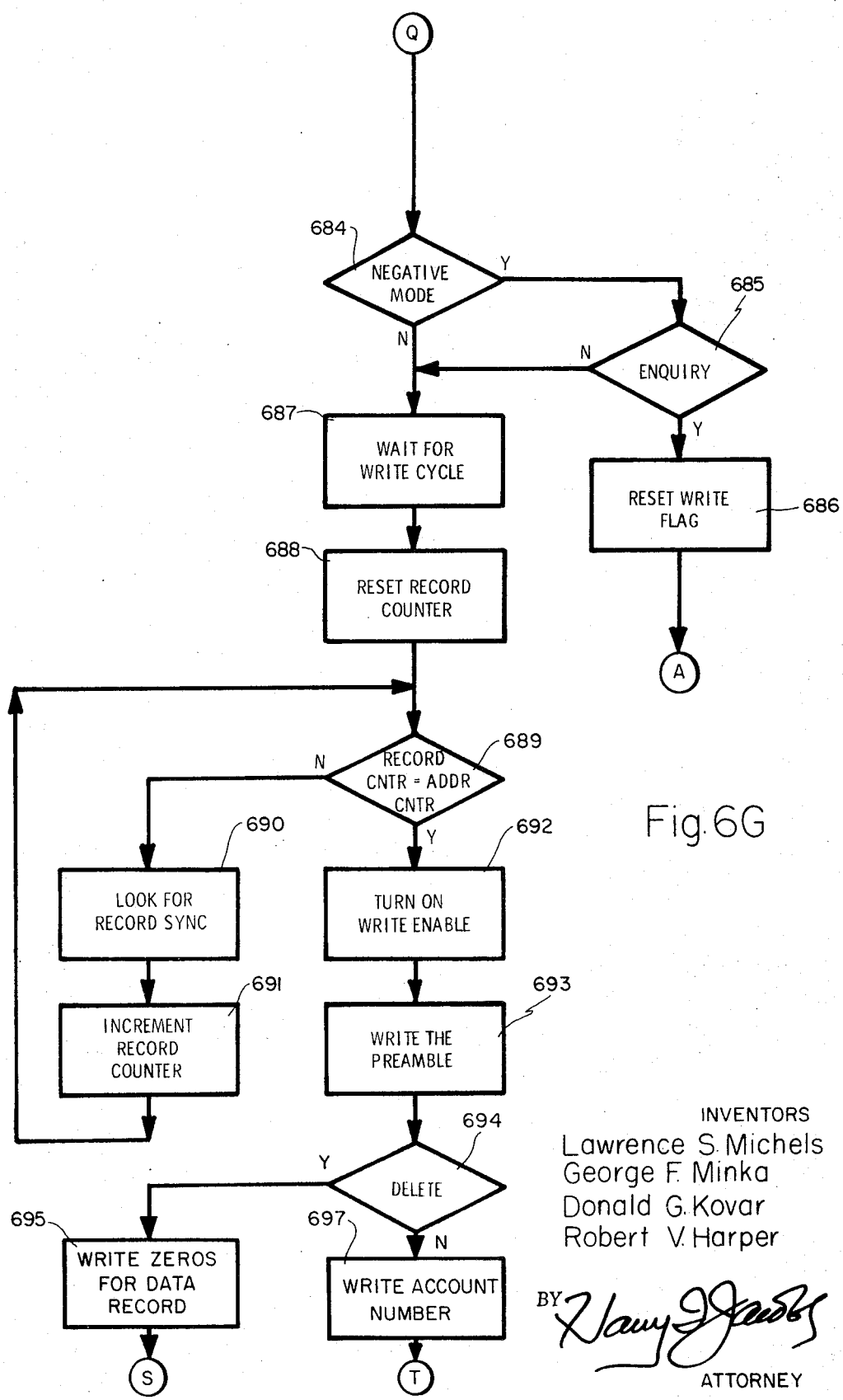
Figure 6H:
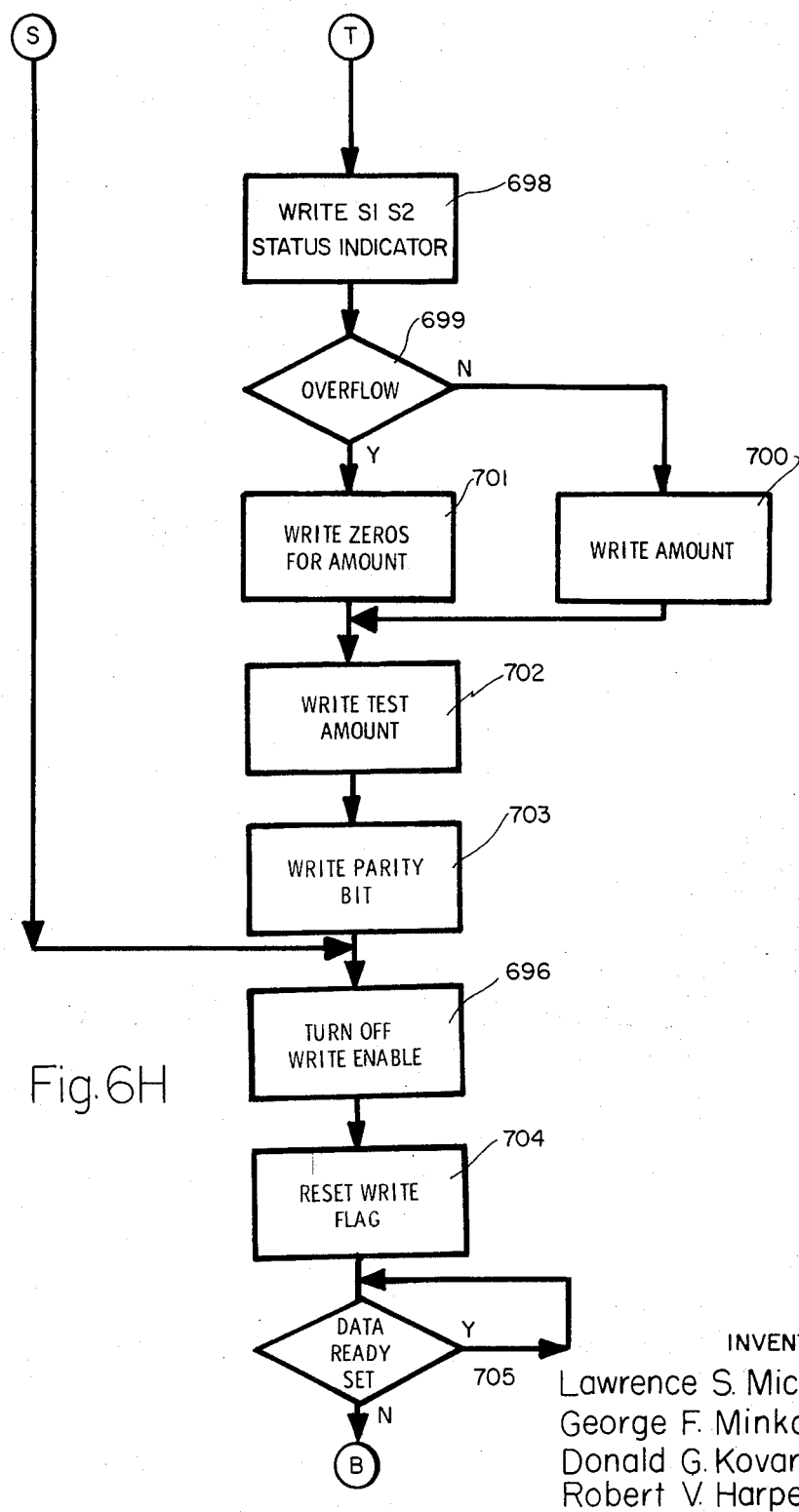

For clarity and convenience the positive by exception mode of operation is reproduced in FIG. 5A.

As will be seen later, the authorizer unit may override yes output from blocks 508 and 512. This means that in the event the accumulated amount plus the amount of the current purchase is greater than the test amount, the authorizer unit can manually enter a new test amount for a single purchase only and change the yellow status response to green.

FIG. 6 is a detailed flow chart of central processor 13. The operation of central processor 13 will be explained, referring to FIG. 6, primarily with respect to the positive by exception mode of operation. Modifications to permit operation in positive and negative modes will be explained where appropriate. In the explanation of the processor flow chart of FIG. 6, reference is made to FIG. 2 where appropriate.

The plurality of letters within circles appearing throughout the sheets of FIG. 6 indicate the points of connection between the sheets.

Block 600 — The cycle of central processor 13 is initiated by start block 600.

Block 601 — Block 601 polls the various processor units 133 to determine which of the plurality of processors is available to accept data. The processors are polled in a predetermined order until a free processor is available.

Blocks 602 – 608 — Block 602 determines if the "data ready" flag is set. If the "data ready" flag is set, block 603 sends information stored in an "output register" back to the originating keyboard thus effecting an output of data. After the information is sent back to the keyboard, block 604 resets the "data ready" flag and block 606 initializes the cycle (or program) when block 605 determines that the "write flag" has been reset. When the "write flag" is set, storage unit 131 is in the write mode, and when the "write flag" is reset, storage unit 131 is in the read mode. Block 607 sets the "processor available" flag. When the "processor available" flag is set, it indicates that a particular processor is available for an inquiry. When the "processor available" flag is reset, it indicates the processor is busy. If the "data ready" flag is reset, block 608 determines whether the "processor available" flag is set. If the "processor available" flag is reset, and a processor is not available, the program returns to start.

Blocks 609 – 612 — If the "processor available" flag is set, indicating a processor is available for use, distributor input block 609 determines whether data is input data from a keyboard or output answer. If the data is output data, block 610 loads the data from the processor, block 611 holds the data for release, and block 612 is the release indicating that the processor should abort because the data is output data.

Blocks 613 – 615 — If the distributor is set so the processor is receiving data from the keyboards, or any other terminal, block 613 stores the address of the processor to which the information is sent in a "zero counter," and block 614 stores the address of the communication adapter (and thus keyboard) from which the data came in an "output register." Block 615 loads the input data from the keyboard to the processor.

Block 616 — Block 616 stores the control character indicative of the type of operation which the device is performing. The types of inquiry typically are: update the file, delete a name from the file, or a normal credit check. The first two mentioned operations are usually initiated from an authorizer unit 12, or from the tape-to-disk unit 134.

Block 617 — Each storage disk may contain a plurality of tracks. Although it is not necessary for the operation of the invention, it is sometimes desirable to have more than one track to speed up the scanning process, and therefore the response time for an operation. Block 617 stores the address of the track or the portion of the disk where the account number inquired about is located.

Block 618 — This block stores data as to the nature of the inquiry with respect to whether it is a debit inquiry (add to credit balance) or a credit inquiry (subtract from credit balance).

Block 619 and 620 — Block 619 determines if there is a check digit error or input error or some other error in the information received from the keyboard. If there is an error the system resets. If there is no error an additional determination is made in block 620 to determine if there is a valid control character. If there is not a valid control character, the system resets and goes back to the start of the cycle.

Blocks 621 – 623 — If there is a valid control character, block 621 resets the "processor available" flag to indicate that the particular processor is busy and will not receive more inquiries. The storage disks located within central processor units 13 have a predetermined read cycle during which it is possible to scan all the information stored on the storage disk. Block 622 waits for the start of the read cycle to insure that every account number may be scanned. At the start of the read cycle, block 623 resets a "record counter." The "record counter" accounts for the number of individual records or account numbers on the disk, so that an address location for the account number can be determined. The record counter is not to be confused with systems that store a particular address for each account number and when queried locates the account number by the particular address. The record counter of the present invention is reset at the beginning of each read cycle.

Blocks 624 – 629 — The loops starting with blocks 624 and 630 occur simultaneously. Block 624 instructs the processor module 1331 to look for an open location on the storage disk or memory file. In the event the account number inquired about is not on the storage disk or memory file an open location and its address are determined. The search for an open location occurs as follows: as the storage disk or memory is scanned, as each address location is reached block 625 determines whether or not that location is filled. If the location is filled, block 632 increments the "record counter." When an open location is reached, block 626 resets the track full flag. Thus the number stored in the "record counter" at the time the track full flag is reset is the address of the open location. Block 627 determines if the account number inquired about is equal to an account number in the memory. That is, if the account number inquired about is stored in the memory. If the account number is found in the memory, the address s of the number of interest determined by the "record counter" is stored. If the account number is not on the memory file, Block 628 stores the address location of the blank location. Hence, at termination block 629, either the address of the blank location or the address of the number of interest is stored.

Blocks 630 – 634 — Block 630 commands block 631 to search the memory file for the account number of interest. The file is searched record by record until the account number of interest is found or until the end of the read cycle is reached. The searching is done by comparing each number on the file to the account number inquired about. If no match is found, block 632 increments "record counter," and upon a match between the account number of interest and the number stored in the record file, block 634 stores status symbols in the "output register." Block 633 determines when the end of the read cycle is reached. The loop from 630 to 633 is traversed once for each account number on the file. The symbols S1 and S2 indicate the status of the account number stored.

Blocks 635 – 640 — Blocks 635 acts in response to the flag stored by block 618. If the transaction is a debit transaction debit block 637 adds the input amount to the stored amount. If the transaction is a credit transaction, block 636 subtracts the input amount from the stored amount. The results of the activities of blocks 636 and 637 are stored in an output register by block 638. Block 639 causes the test amount, which is a predetermined credit limit set by the store, to be stored in the "output register." Block 640 is an error detector that checks parity of the record on file. If there is a parity error, the account number is considered "not equal," and the record counter is incremented by block 632.

Block 641 — This block resets the "track full" flag when the desired account number is located on file. Block 641 has a similar function to block 626.

Blocks 642 – 644 — Block 642 stores the number contained in the "record counter" in the "address register." Thus the address location of the desired account number is stored in the address register. Block 643 sets a "write flag" and block 644 determines whether the type of inquiry is a credit check in which case the "yes" path from block 644 is followed, or an update or delete in which case the "no" path from block 644 is followed. Block 644 makes the determination based on the control character stored by block 616.

Blocks 645 – 646 — These blocks perform essentially the same functions as blocks 643 and 644 respectively except that the desired account number was not found on file.

Block 647 – 651 — Block 647 determines if a particular track on the storage memory is full. If the track is full, block 648 resets the "write flag," and block 649 stores an appropriate status symbol, i.e. yellow light signal, in the "output register." Block 603 outputs the data back to the keyboard group on command, and block 606 initializes the program for another operation. If the track is not full, block 650 determines whether the "write flag" is on. If the "write flag" is not on block 651 determines whether the "data ready" flag is set. If the "data ready" flag is set, the system, in effect, idles until the "data ready" flag is reset. When the "data ready" flag is reset, the output returns to the beginning of the cycle (or program). The normal procedure is, however, that the "write flag" is on, whereupon the system prepares to write the information onto the storage memory as will be explained later.

Blocks 652 – 654 — If the desired account number is not on file, block 652 stores the dollar amount of the sale, entered via the keyboard group in the output register. Block 653 stores the test amount in the output register. Recall that the test amount is the standard "open to buy" or "Credit limit" which is predetermined. Block 654 determines whether the dollar amount of the sale is over the test amount or credit limit.

Blocks 655 – 658 — If the amount of the sale is not over the test amount, block 655 stores a "valid credit" or green light signal in the output register, thus paving the way for a green light at the keyboard group. Block 656 transfers the output data from the "output register" to the "input register." Data stored in the "input register" ultimately is written onto the file. Block 657 sets the "data ready" flag to signal the distributor that the data is ready to return to the keyboard. Block 658 determines whether the transaction is a "debit" or "credit" transaction in accordance with the "add/subtract" flag stored by block 618. If block 658 determines that the transaction is a "debit" transaction, the information is passed along to be written onto the file.

Block 659 — If the transaction is a "credit" transaction, indicating that a customer is not on file is perhaps paying a bill, block 659 resets the "write flag" to prevent an entry onto the memory file.

Blocks 660 – 662 — If block 654 determines that an over limit exists, meaning that the dollar amount of the sale exceeds the credit limit for a particular customer, block 660 stores a yellow indicator in the "output register," block 661 transfers the data in the "output register" to the "input register". Block 662 sets the "data ready" flag and as before block 659 prevents entry onto the memory file.

Blocks 663 – 665 — These blocks are used only when the system is programmed to operate in a full positive mode. Block 663 determines if the system is programmed to operate in a positive mode. If the system is not operating in a full positive mode, block 650 determines if the "write flag" is on as explained above. If the system is operating in a full positive mode, block 664 stores either a yellow or red light signal in the "output register," and block 665 resets the "write flag" to prevent writing onto the memory file.

Blocks 666 and 667 — Authorizer unit 12 has the ability to release, for one transaction only, a purchase which, when totaled with past purchases, exceeds the credit limit of the customer. Block 666 determines if the authorizer has released for one transaction. If so, then block 667 resets the $S_1$ flag thus bypassing restricted status block 669 and overlimit check 674 to permit a release. A green light is sent back to the keyboard for the present transaction only.

Block 668 — This block makes a decision in response to the add or subtract flag stored by block 618. If the subtract flag is stored, it indicates the customer is probably paying a bill, hence the restricted status block 669 and overlimit check 674 portion of the cycle is skipped.

Blocks 669 and 670 — Block 669 determines if the status stored in the output register is restricted (not green). If so, block 670 sets the "data ready" flag which signals a distributor unit that data (not green signal indication) is ready to return to the keyboard.

Blocks 671 – 673 — Overflow block 671 determines whether the accumulated dollar amount inquired about is greater than the system capacity. If the accumulated dollar amount inquired about is greater than the system capacity, block 672 stores a yellow light status indicator in the output register. Block 673 then resets the "write flag" to prevent writing onto the memory file. If the accumulated amount is within the capacity of the system, the status digits read from the file remain in the output register, and block 673 resets the "write flag." Block 603 starts the output of data back to the keyboard as explained above. Thus the status symbols stored in the "output register" by blocks 649, 655, 660, 664, 672, 675 and 683 are transferred ultimately to the keyboard where an appropriate light signal is displayed.

Block 674 — Block 674 determines whether the accumulated amount exceeds the test amount. This operation is equivalent to that shown in block 508 of FIG. 5.

Blocks 675 – 678 — If the accumulated amount exceeds the test amount, block 675 stores a yellow light status indicator in the output register. Block 676 transfers the yellow light status indicator singal stored in the "output register" to the "input register," block 677 sets the "data ready" flag and block 678 resets the "write flag." The data stored in the "output register" is ultimately transferred to the keyboard where an appropriate light signal is displayed.

Blocks 679 and 680 — Block 679 transfers the information in the "output register" to the "input register" if block 674 determines that the accumulated amount does not exceed the test amount, or if block 668 determines the subtract flag is stored by block 618, or if blocks 666 and 667 indicate that the authorizer unit has released a restricted account for one transaction only. The "input register" stores the data for ultimate writing on the file.

Blocks 681 – 683 — Block 681 determines whether the total dollar amount exceeds system capacity in a manner similar to the determination made by block 671. If the capacity of the system is exceeded, block 682 determines whether an add or subtract flag has been stored by block 618. If the transaction is a subtract transaction, which could occur if there is an over payment of a bill, block 683 stores a green status indicator signal in the "output register." If block 682 determines the transaction is an add transaction, block 672 stores a yellow status indicator signal in the "output register," and block 673 resets the "write flag" to prevent writing on the master file.

Blocks 684 – 686 — These blocks are used only when the system is programmed for the negative mode of operation. If the system is programmed for the negative mode, block 685 determines whether the transaction is an ENQUIRY (credit check), or determines whether an updated or delete. If the transaction is an ENQUIRY, block 686 resets the "write flag" and status information generated by block 634 or 655 ultimately returns to the originating keyboard. If the transaction is an update or delete the cycle proceeds as if the the system were not programmed to operate in the negative mode.

Blocks 687 and 688 – Block 687 waits until a signal is received indicating the start of a "write cycle," and block 688 resets the "record counter." Recall that the "record counter" keeps track of the address location of each account number along the track on the memory file.

Blocks 689 – 691 — The loop formed by blocks 689 to 691 to 689 advances the "record counter" until the number stored in the "record counter" equals the number in the "address counter." The number stored in the "address counter" was placed there in accordance with a command from blocks 642 628. If the number stored in the "record counter" is not equal to the number stored in the "address counter," block 690 block looks for a "record sync" pulse, and block 691 increments the "record counter."

Blocks 692 – 693 — When the number stored in the "record counter" equals the number stored in the "address counter," block 692 turns on the "write enable," and block 693 writes a preamble which prepares the processor to write or delete information onto the memory file.

Blocks 694 – 703 — At this point the system is ready to write on the memory file and the write heads have been advanced to either a blank address location or the location of the account number of interest. Block 694 makes a determination in accordance with the instructions stored by block 616 as to whether this transaction is a delete or an update. If the transaction is a "delete," block 695 deletes by writing zeros onto the data file. Block 696 then turns off the write enable. If block 616 has stored an "update" or "enquiry" control character, as determined by block 694, block 697 writes the account number onto the file and block 698 writes the appropriate status signal indicators onto the file. Block 699 determines whether the system has overflowed by exceeding its capacity. If the capacity has not been exceeded, block 700 writes the new accumulated dollar amount into the file. If block 699 determines that the system capacity has been exceeded, block 701 writes zeros for the amount. Block 702 enters the new credit limit, which may be a predetermined standard limit, the old limit read from the credit file, or a new limit from the authorizer. Block 703 writes a parity bit, which is an error-checking bit during read cycle, onto the file, and block 696 turns off the write enable.

Blocks 704 and 705 — Block 704 resets the "write flag" to prevent further additions to the memory. Block 705 waits until a distributor has sent the information back to the keyboard group. Hence the loop around block 705 operates until a distributor sends the output, and block 606 then initializes the cycle or program.

Summarizing the above, blocks 600 to 620 are concerned loading and setting up to process the account number, and with checking the validity of the control characters entered. Blocks 621 to 673 are concerned with conditioning the processor to write onto the memory and for checking credit limits. Blocks 663 to 665 are used only when the system is operating in a full positive mode. Blocks 684 to 686 are only used when the system is operating in a full negative mode. Blocks 687 to 705 are concerned with how the system operates to write onto the memory files.

Thus a computer program and block diagrams have been disclosed which should enable a person skilled in the art to construct a credit checking system according to the present invention.

What is claimed is:

1. A credit control system comprising:
 a memory for storing customer account identification symbols, credit status symbols, credit limit symbols and accumulated balance symbols;
 first means for loading into the memory said customer account identification symbols, credit status symbols, credit limit symbols and accumulated balance symbols;
 coincidence means for comparing a generated customer account identification symbol to be checked with the customer account identification symbols stored in said memory, said coincidence means producing signals indicating the presence or absence in the memory of said generated customer account identification symbol;
 second means, responsive to the absence of said customer account identification symbol in said memory, for comparing a purchase amount symbol associated with said generated symbol with a preselected credit limit to determine whether the purchase amount symbol associated with said generated symbol exceeds the preselected credit limit;
 third means, responsive to a determination that said purchase amount symbol associated with said generated symbol does not exceed said preselected limit, for loading said memory with said generated customer identification symbol, an appropriate status symbol and said purchase amount symbol associated with said generated symbol;

fourth means, responsive to the presence of said generated customer account identification symbol in said memory, for determining whether the status of the generated symbol is restricted;

fifth means, responsive to a proper status determination by said fourth means, for determining whether the sum of the accumulated balance associated with said generated symbol, and the purchase amount exceeds the credit limit for said generated symbol; and sixth means, responsive to a proper determination by said fifth means, for loading said memory with the sum of the accumulated balance and current purchase amount for said generated symbol customer account.

2. A credit control system as claimed in claim 1 and further including:

means for performing check digit verification on the customer account identification symbol.

3. A credit control system as claimed in claim 1 wherein said memory is cyclically scanned by said coincidence means.

4. A credit control system as claimed in claim 1 wherein said coincidence means for comparing the generated customer account identification symbol with the customer account identification symbols stored in said memory comprise:

means for cyclically scanning each customer account identification symbol stored in said memory;

means for determining the start of a read cycle;

a resettable record counter capable of incrementing in response to a pulse;

means for resetting said record counter at the start of a read cycle;

means for comparing each customer account identification symbol stored in said memory with the generated customer account identification symbol;

means for incrementing said record counter in response to a pulse output from said comparator indicating each read symbol stored in said memory is not the same as the generated symbol;

an address register; and means for storing the count in said record counter in said address register in response to an output from said comparator indicating the read symbol stored in said memory is the same as the generated symbol.

5. A credit control system as claimed in claim 4 and further including means for finding a blank location in said memory comprising:

means for looking for an all zero record;

means for indicating the end of a read cycle; and means for storing the count in said record counter in said address register in response to said means for looking for an all zero record; so that the number stored in said address register represents the address of an available blank space in said memory.

6. In an automatic machine implemented method of checking credit which includes the steps of storing in an automatic machine customer account identification symbols, and associated credit status symbols, credit limit symbols and accumulated balance symbols, generating a customer account identification symbol to be checked and a present purchase amount symbol associated therewith, and determining whether the customer account identification symbol to be checked is stored in the machine, the improvement comprising the steps of:

determining whether the present purchase amount is greater or less than a preselected credit limit if the customer account identification symbol to be checked is not stored in the machine;

sending an appropriate invalid credit status response if the present purchase amount is greater than the preselected credit limit; and storing in the automatic machine the customer account identification symbol being checked, an associated credit status symbol, the preselected credit limit symbol and the present purchase amount, if the present purchase amount is less than the preselected credit limit, and sending an appropriate valid credit status response.

7. An automatic machine implemented method of checking credit as claimed in claim 6 and further including the steps of:

determining whether the associated credit status symbol indicates a restricted account, if the customer account identification symbol to be checked is stored in the machine;

sending an appropriate invalid credit status response if the associated credit status symbol indicates a restricted account;

determining whether the present purchase amount added to the accumulated balance is greater or less than the associated credit limit if the associated credit status symbol indicates a not restricted account; and sending an appropriate invalid credit status response if the present purchase amount added to the accumulated balance is greater than the associated credit limit.

8. An automatic machine implemented method of checking credit as claimed in claim 7 and further including the steps of:

increasing the accumulated balance by the present purchase amount; and sending an appropriate valid credit status response if the present purchase amount added to the accumulated balance is less than the associated credit limit.

9. An automatic machine implemented method of checking credit as claimed in claim 16 and further including the steps of:

increasing the accumulated balance by the present purchase amount and sending an appropriate valid credit status response if the present purchase amount added to the accumulated balance is less than the associated credit limit;

determining whether the present purchase amount is greater or less than a preselected credit limit if the customer account identification symbol to be checked is not stored in the machine;

sending an appropriate invalid credit status response if the present purchase amount is greater than the preselected credit limit; and storing in the automatic machine the customer account identification symbol being checked, an associated credit status symbol, the preselected credit limit symbol and the present purchase amount, if the present purchase amount is less than the preselected credit limit, and sending an appropriate valid credit status response.

10. An automatic machine implemented method of checking credit as claimed in claim 16 and further including the step of:

performing check digit verification on the customer account identification symbol.

11. An automatic machine implemented method of checking credit as claimed in claim 16 wherein the step of determining whether the customer account identification symbol to be checked is stored in the machine comprises:

waiting for the start of a read cycle;

resetting a record counter at the start of said read cycle;

reading successively each account identification symbol stored in said machine;

comparing each account identification symbol read with the generated customer account identification symbol to be checked;

incrementing said record counter when an account identification symbol read is not equal to the customer account identification symbol to be checked; and storing the record count in an address register when the account identification symbol read is equal to the customer account identification symbol to be checked.

* * * * *